(12) United States Patent
Chern et al.

(10) Patent No.: US 11,795,339 B2
(45) Date of Patent: Oct. 24, 2023

(54) 3D PRINTING SET AND METHOD FOR 3D INKJET PRINTING BY USING THE SAME

(71) Applicant: National Taiwan University of Science and Technology, Taipei (TW)

(72) Inventors: Chorng-Shyan Chern, Taipei (TW); Jeng-Ywan Jeng, Taipei (TW); Ya-Ting Chang, Taipei (TW); Cheng-Che Lu, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 171 days.

(21) Appl. No.: 17/363,640

(22) Filed: Jun. 30, 2021

(65) Prior Publication Data

US 2022/0220328 A1 Jul. 14, 2022

(30) Foreign Application Priority Data

Jan. 14, 2021 (TW) .................................. 110101359

(51) Int. Cl.
*B29C 64/112* (2017.01)
*C09D 11/40* (2014.01)
*B33Y 10/00* (2015.01)
*B33Y 70/00* (2020.01)
*C09D 11/102* (2014.01)
*C09D 11/38* (2014.01)
*B29K 75/00* (2006.01)
*B29K 77/00* (2006.01)
*B29K 105/00* (2006.01)

(52) U.S. Cl.
CPC ............ *C09D 11/40* (2013.01); *B29C 64/112* (2017.08); *B33Y 10/00* (2014.12); *B33Y 70/00* (2014.12); *C09D 11/102* (2013.01); *C09D 11/38* (2013.01); *B29K 2075/00* (2013.01); *B29K 2077/00* (2013.01); *B29K 2105/0014* (2013.01); *B29K 2105/0032* (2013.01)

(58) Field of Classification Search
None
See application file for complete search history.

(56) References Cited

FOREIGN PATENT DOCUMENTS

| CA | 2 378 348 A1 | * | 7/2000 |
| WO | WO-2016 085914 A1 | * | 6/2016 |
| WO | WO-2020 243213 A1 | * | 12/2020 |

* cited by examiner

*Primary Examiner* — Mohammad M Ameen

(57) ABSTRACT

The present invention provides a method for 3D inkjet printing, which comprises: a preheating step: an external heating source is used to heat a main body layer composed of a first composition to a first temperature, wherein the main body layer has a thickness of 10 μm to 500 μm and a unit density of 0.1 to 1.0 g/cm³, and the first temperature is less than the melting point of the first composition; a heating step: a second composition is applied to the surface of the first composition at the first temperature of the composite to proceed an exothermic cross-linking polymerization, so that the main body layer is heated to a second temperature to become a molten state; and a cooling step: the main body layer in the molten state is cooled down and solidified to form.

6 Claims, 18 Drawing Sheets

3D PRINTING SET AND METHOD FOR 3D INKJET PRINTING BY USING THE SAME

CROSS-REFERENCE TO RELATED APPLICATIONS

This application claims the benefit of Taiwanese Patent Application No. 110101359, filed on Jan. 14, 2021, the contents of which are incorporated herein by reference in their entireties.

BACKGROUND OF THE INVENTION

1. Field of the Invention

The present invention relates to the 3D printing technology, and in particular, to a 3D inkjet printing technology.

2. Description of the Related Art

Due to convenient Rapid Prototyping (RP), the 3D printing technology can reduce research and development costs, shorten research and development cycles, improve the success rate of new product development, and meet the needs of personal production and on-site manufacturing and other excellent characteristics. As a result, 3D printing has continued to develop rapidly since its inception in the 1980s. Not only the related technologies, devices, processes, methods, etc., have continued to innovate and break through, but also 3D printing models and types have continued to be introduced, and the quality and speed of printing, printable item size, output stability and other aspects have also been significantly improved. In recent ten years, the 3D printing market has grown and expanded by leaps and bounds.

Basically, the 3D printing and molding technology is a rapid prototyping method for automatically and rapidly making design images of complicated shapes into physical objects of three-dimensional shapes in a technical concept like building pyramids without using knives, molds or fixtures. In fact, 3D printing is to solubilize, solvate or melt molding materials containing specific plastics, metals and other components, and then direct-precision inkjet print on a flat surface using 3D printing device, sinter, bond, dry, and cure with light energy, electrical energy, and chemical energy to form an XY-axis two-dimensional plane layer, and then move and accurately to a position in the Z-axis direction and superimpose layer by layer based on the principles of layering, stacking, and additive manufacturing to form a three-dimensional physical object with a three-dimensional shape.

At present, there are various 3D printing methods, for example, Fused Deposition Modeling (FDM, also known as Fused Filament Fabrication (FFF)), Laminated Object Manufacturing (LOM), Digital Light Processing (DLP, also known as Film Transfer Imaging, (FTI)), Stereo-lithography Apparatus (SLA), Plastic-based 3D printing or Powder bed and inkjet head 3D printing (3DP), Selective Laser Sintering (SLS), Selective Laser Melting (SLM, or known as Direct Metal Laser Sintering (DMLS)), and other three-dimensional molding modes. In addition, Hewlett-Packard Inc. has released Multi Jet Fusion technology in 2014. This technology is a 3D printing system that uses a thermal bubble print head to eject a thermal catalyst for patterning, inducing the thermal catalyst to release heat to 200° C. to melt the plastic powder after infrared light irradiation, and directly melting the plastic powder, and has both speed and accuracy.

However, since most of the thermal catalysts used in the above-mentioned Multi Jet Fusion technology contain some dark light-absorbing substances, most of the finished products after printing are dark. If light-colored materials are used, energy absorption may be reduced, resulting in molding failure or prolonged molding time. In addition, the existing Multi Jet Fusion technology can only cause physical cross-linking of 3D molding materials, so the mechanical strength is still insufficient. Therefore, how to develop a solution that can solve the shortcomings of the conventional technologies above is actually an urgent problem that needs to be solved by persons in the related technical fields.

SUMMARY OF THE INVENTION

Therefore, through painstaking research and searching for various possible solutions to solve the problems of the conventional technology, the inventors have developed a 3D inkjet printing method, i.e., rapidly spraying a reactive fusion agent on a print zone of the preheated polymer powder, and applying a near-infrared light heat source to initiate the cross-linking polymerization reaction between the reactive fusion agent and the polymer powder and release a large amount of heat to generate the synergistic effect, which causes the temperature to be higher than the melting point of the polymer powder, so the polymer powder can be melted and molded with lower heat, and the mechanical strength of the finished product can be effectively improved through chemical cross-linking. The printing speed of the present invention is more than 10 times faster than the conventional 3D laser sintering polymer powder technology. Objects with excellent mechanical properties can be completed in a short period of time, with the density and precision being equivalent to mold injection molding. Therefore, the present invention has wider application, but can save the high cost of developing molds, and thus sets a new milestone for product proofing and digital manufacturing in the industry. In addition, since the present invention uses the heat of chemical reaction to melt the polymer powder, even if a light-colored pigment is added for printing, the printing speed and quality will not be affected.

That is, the present invention can provide a method for 3D inkjet printing, including: a preheating step: using an external heating source to heat a main body layer composed of a first composition to a first temperature, where the main body layer has a thickness of 10 μm to 500 μm and a unit density of 0.1 to 1.0 g/cm³, and the first temperature is less than the melting point of the first composition; a heating step: applying a second composition to the surface of the first composition at the first temperature to proceed an exothermic cross-linking polymerization, so that the main body layer is heated to a second temperature to become a molten state; and a cooling step: cooling down the main body layer in the molten state and solidifying the main body layer to form single-layer printing.

According to an example of the present invention, the first composition includes at least a molding material, the molding material being a compound A of a chemical structure represented by chemical formula (I), a compound B of a chemical structure represented by chemical formula (II), or a polyamine compound:

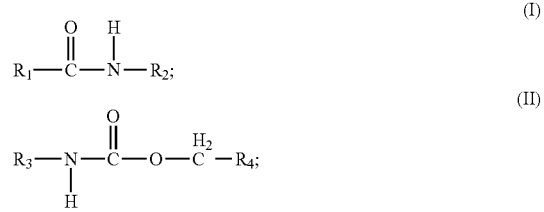

in the chemical formulas (I) and (II), $R_1$, $R_2$, $R_3$, and $R_4$ each independently represent alkyl or aryl.

According to an example of the present invention, the second composition includes at least a compound C having O=C=N— functional groups, and a weight ratio of the molding material in the main body layer to the compound C is in a range of 1:1 to 10:1.

According to an example of the present invention, a difference between the first temperature and the melting point of the first composition is in a range of 10° C. to 100° C.

According to an example of the present invention, the second temperature is greater than the melting point of the first composition.

According to an example of the present invention, the second composition further includes at least one component selected from the group consisting of a catalyst, a physical property modifier, a dispersing agent, a cosolvent, and a coloring agent.

According to an example of the present invention, the catalyst in the 3D inkjet printing method is dibutyltin dilaurate (DBTDL).

According to an example of the present invention, the physical property modifier is at least one selected from the group consisting of polyols, polyether polyols, polyester polyols, and combinations thereof.

According to an example of the present invention, in the heating step, the second composition is applied to the surface of the first composition by any one of a flat coating method, a sputtering method, a spraying method, a cast coating method, a roll coating method, and a strip coating method.

According to an example of the present invention, the second composition further includes at least one component selected from the group consisting of a catalyst, a physical property modifier, a dispersing agent, a cosolvent, and a coloring agent.

According to an example of the present invention, the catalyst is dibutyltin dilaurate (DBTDL).

According to an example of the present invention, the physical property modifier is at least one selected from the group consisting of polyols, polyether polyols, polyester polyols, and combinations thereof.

DETAILED DESCRIPTION OF THE PREFERRED EMBODIMENTS

Hereinafter, different specific embodiments are listed for the implementation of the present invention to describe and explain in more detail, so as to make the spirit and content of the present invention more complete and easy-to-understand. However, those of ordinary knowledge in the art should understand that the present invention is not limited to these examples, and other same or equivalent functions and sequence of steps can also be used to achieve the present invention.

The foregoing and other technical content, features, and effects of the present invention will be clearly presented in the following detailed description of the implementation with reference to the drawings. The directional terms mentioned in the following embodiments, for example: up, down, left, right, front or back, etc., are only directions for referring to the accompanying drawings. Therefore, these directional terms are only intended to illustrate rather than limit the present invention, and the present invention can be implemented in any other way.

Figure 1:
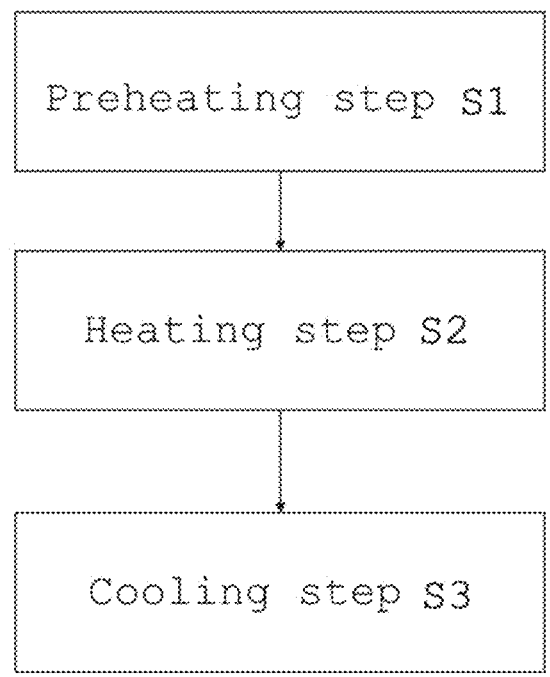
FIG. 1 is a standard flowchart showing high-speed 3D inkjet printing of the present invention.

First, FIG. 1 is a standard flowchart showing high-speed 3D inkjet printing of the present invention. The method includes a preheating step S1, a heating step S2, and a cooling step S3.

In the preheating step S1, the first composition is evenly layered by a roller to form a main body layer, and an external heating source is used to heat the main body layer to the first temperature. The first composition includes at least a molding material. The molding material is a compound A of a chemical structure represented by chemical formula (I), a compound B of a chemical structure represented by chemical formula (II), or a polyamine compound:

(I)

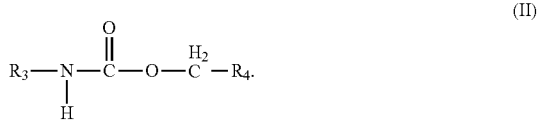

(II)

According to an aspect of the present invention, in the chemical formulas (I) and (II), $R_1$, $R_2$, $R_3$, and $R_4$ each independently represent alkyl or aryl. For example, the compound A may be a semi-crystalline polyamide, preferably polyamide-6 (PA-6), polyamide-66 (PA-66), polyamide-610 (PA-610), polyamide-1010 (PA-1010), polyamide-11 (PA-11), polyamide-12 (PA-12), polyamide-9 (PA-9), polyamide-612 (PA-612), polyamide-121 (PA-121), polyphthalamide (PPA), and polyparaphenylene terephthalamide (PPTA). The compound B may be polyurethane (PU), preferably, thermoplastic polyurethane (TPU).

Furthermore, in an example, a preferred example of the polyamine compound includes at least one of straight-chain aliphatic polyamines, branched-chain aliphatic polyamines, and cyclic aliphatic polyamines, and more preferably, ethylenediamine, 1,3-propanediamine, 1,4-butanediamine, 1,5-pentanediamine, diethylenetriamine, 1,2-propanediamine, 1,4-diazacycloheptane, and phenylenediamine.

Moreover, the thickness of the main body layer is not particularly limited, and is generally in a range of 10 μm to 500 μm, preferably in a range of 10 μm to 300 μm, and more preferably in a range of 50 μm to 150 μm. In addition, the unit density of the main body layer is generally in a range of 0.1 g/cm$^3$ to 1.0 g/cm$^3$, preferably in a range of 0.2 g/cm$^3$ to 0.9 g/cm$^3$, and most preferably in a range of 0.4 g/cm$^3$ to 0.6 g/cm$^3$.

Then, the heating step S2 is to apply a second composition to the surface of the first composition at the first temperature. The coating method can be any one of a flat coating method, a sputtering method, a spraying method, a cast coating method, a roll coating method, and a strip coating method; preferably, the second composition is sprayed onto the surface of the first composition by using a thermal bubble print head or a piezoelectric print head. The thermal bubble print head or the piezoelectric print head can control the spraying range through a processing unit of the 3D printing device, thereby conforming to patterns of a plurality of profile files of a 3D object to be printed. When the thermal bubble print head is used, the viscosity of the second composition at room temperature is preferably 4 cps or less. When the piezoelectric print head is used, the viscosity of the second composition at room temperature is preferably 6 to 8 cps, 19 to 23 cps, or 30 cps.

The second composition contains a functional reactive fusion agent capable of chemically reacting with the first composition and releasing heat. Therefore, cross-linking polymerization occurs after the first composition comes into contact with the second composition, so that the main body layer heated to a second temperature to become the molten state.

According to the technical idea of the present invention, the second composition includes at least a compound having O=C=N— functional groups, especially compound C having a chemical structure represented by chemical formula (III):

O=C=N—R$_5$—N=C=O            (III)

In the chemical formula (III), $R_5$ represents alkyl or aryl. For example, the compound C can be toluene diisocyanate (TDI), isophorone diisocyanate (IPDI), diphenyl methane diisocyanate (MDI), dicyclohexylmethane diisocyanate ($H_{12}$MD I), and lysine diisocyanate (LDI).

In addition, the compound C can also be HDI polyisocyanates, such as HDI isocyanurate trimer, for example, 1,3,5-triazine-2,4,6(1H,3H,5H)-trione), 1,3,5-tris(6-isocyanatohexyl); or HDI biuret, such as 1,3,5-tris(6-hydroxyhexyl)biuret triisocyanate. Furthermore, the compound C can also be cyanate salts, such as potassium cyanate, sodium hydrogenate, or ammonium cyanate.

In accordance with the above, in addition to the compound C, the second composition further includes any one or more of a solvent, a catalyst, a physical property modifier, a dispersing agent, a cosolvent, and a coloring agent.

According to the creative idea of the present invention, the catalyst can be one or more of dibutyltin dilaurate (DBTDL), triethylene diamine, stannous octoate, dioctyltin dilaurate, bismuth methanesulfonate, and bismuth carboxylate.

Furthermore, according to the creative idea of the present invention, the physical property modifier may be polyols, such as ethylene glycol, diethylene glycol, glycerol, 1,4-butylene glycol, 1,6-hexanediol, tripropylene glycol, trimethylolpropane, and pentaerythritol; polyether polyols, such as polyethylene glycol (PEG), polypropylene glycol (PPG), and polytetramethylene ether glycol (PTMG); or polyester polyols (PE) including aliphatic polyester polyols and aromatic polyester polyols.

In addition, the coloring agent may be pigments of different colors such as carbon black, a white pigment, a red pigment, or a yellow pigment, so that the coloring can be completed at the same time during the 3D printing.

The external heating source used in the example of the present invention is a near-infrared light heater having a wavelength of 1 μm to 700 nm, which is not limited thereto, and a resistive heater or an electromagnetic heater can also be used to control the ambient temperature as the first temperature.

Furthermore, in order to make the first composition fully react with the second composition, the weight ratio of the molding material in the first composition to the compound C in the second composition is generally in a range of 1:1 to 10:1, preferably in a range of 1:1 to 5:1, and more preferably in a range of 1:2 to 1:3.

In addition, in the cooling step S4, the external heating source is removed after a reaction time, so that the main body layer is cooled down and solidified to form single-layer printing. The reaction time is generally in a range of 0.05 second to 100 seconds, preferably in a range of 0.05 second to 80 seconds, more preferably in a range of 0.1 second to 70 seconds, and most preferably in a range of 0.1 second to 50 seconds.

According to the creative idea of the present invention, the first temperature is generally lower than the melting point of the first composition, and the difference between the first temperature and the melting point of the first composition is preferably in a range of 10° C. to 100° C., more preferably in a range of 10° C. to 80° C., and most preferably in a range of 10° C. to 50° C. In addition, the second temperature is generally higher than the melting point of the first composition, and the difference between the second temperature and the melting point of the first composition is preferably in a range of 10° C. to 100° C., more preferably in a range of 10° C. to 80° C., and most preferably in a range of 10° C. to 50° C.

The present invention is further illustrated with specific examples below.

"Analysis of Thermal Properties of Polyamide PA-12"

Figure 2:
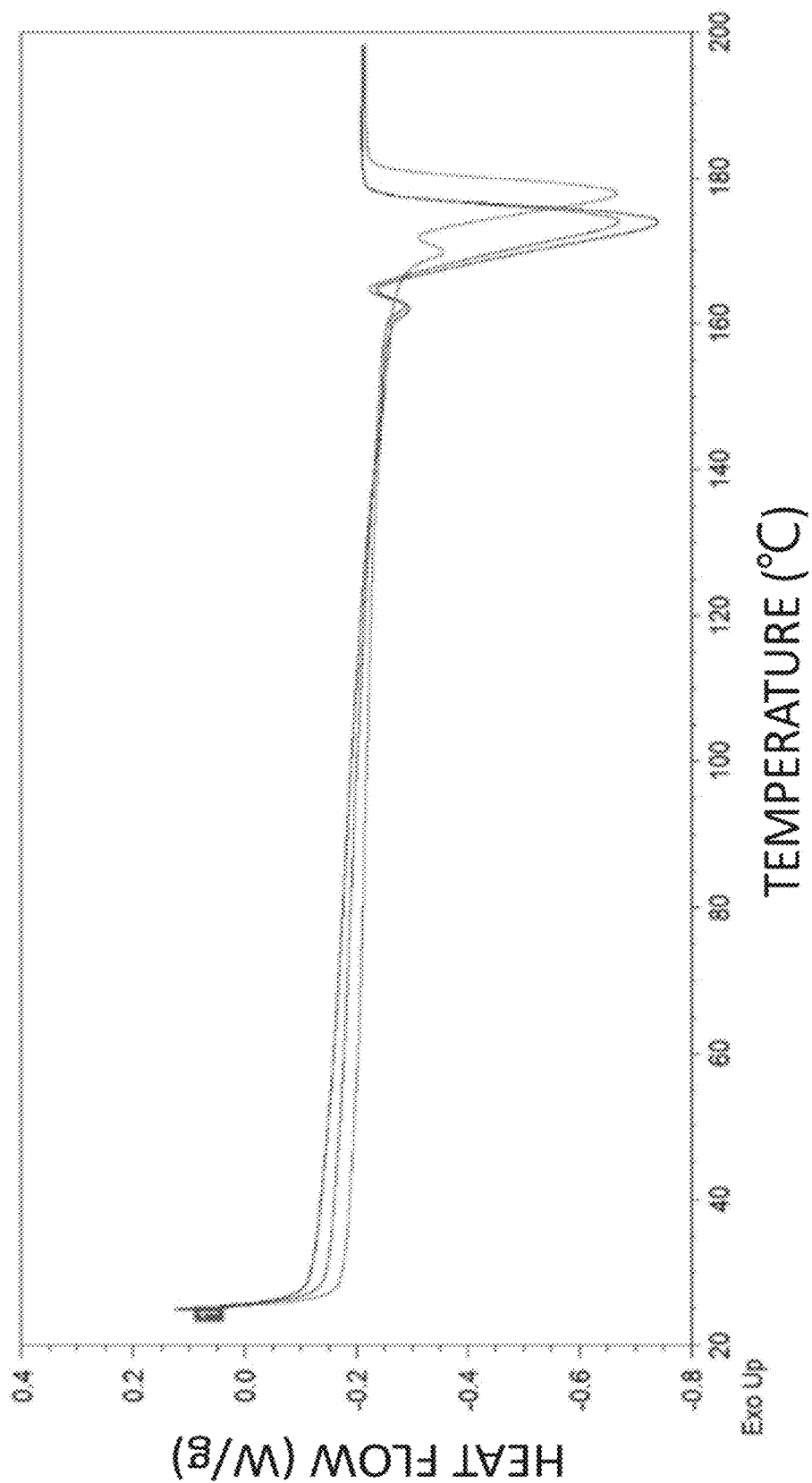
FIG. 2 is a graph showing comparison of non-constant temperature scanning curves of PA-12 in an example of the present invention.

First, non-constant temperature scanning is performed on polyamide PA-12 powder of the first composition by using a Differential Scanning calorimetry (DSC) to identify the thermal properties of the PA-12 powder. The heating scanning speed used is 5° C./min, and scanning from room temperature to 200° C. necessarily requires annealing heat treatment of a sample under the same conditions. The non-constant scanning DSC curve of PA-12 is as shown in FIG. 2. The thermal property data of the polyamide obtained after the sample is annealed are recorded in Table 1.

TABLE 1

| Sample | Onset Tm (° C.) | Peak Tm (° C.) | Total melting heat (J/g) |
|---|---|---|---|
| PA-12 | 165.68 | 174.01 | 58.07 |
|  | 165.95 | 174.11 | 52.69 |
|  | 171.62 | 177.91 | 52.70 |
| Mean value | 167.8 ± 2.7 | 175.3 ± 1.8 | 54.5 ± 2.5 |

It can be known from the analysis of thermal properties in Table 1 and FIG. 2 that the melting point of PA-12 used in the present invention is about 175° C. The experimental results in this part can help design the first temperature used in the 3D printing process. Subsequent DSC analysis experiments of the exothermic polymerization reaction of PA-12 and the second composition may be performed at 160° C., 165° C., and 180° C. as the first temperature.

"Constant temperature scanning analysis of a second composition containing a catalyst and polyamide PA-12 powder"

PA-12, $H_{12}$-MDI, and N-methylpyrrolidone (NMP) containing dibutyltin dilaurate (DBTDL) are uniformly mixed at the weight ratio shown in Table 2, and constant temperature scanning is performed with a Differential Scanning calorimetry (DSC) under the temperature conditions shown in Table 2, and the exothermic peak time of each sample and the total heat per g sample of the sample are recorded in Table 2. The reactive fusion agent $H_{12}$-MDI is dissolved in methyl ethyl ketone (MEK) (the preparation concentration is 30 wt %).

TABLE 2

| Sample | Composition (weight ratio) | | | Temperature (° C.) | Peak time (min) | Heat (J/g)[a] | Heat (J/g)[b] |
|---|---|---|---|---|---|---|---|
| | PA-12 | $H_{12}$MDI | Second composition DBTDL/NMP | | | | |
| 1 | 1 | 1 | 4 × 10⁻³/0.396 | 160 | 2.39 | 10.39 | 24.94 |
| 2 | 2 | 1 | 4 × 10⁻³/0.396 | | 1.75 | 9.01[c] | 27.39 |
| 3 | 3 | 1 | 4 × 10⁻³/0.396 | | 1.70 | 7.47[c] | 32.87 |
| 4 | 4 | 1 | 4 × 10⁻³/0.396 | | 1.16 | 13.47 | 72.74 |
| 5 | 5 | 1 | 4 × 10⁻³/0.396 | | 1.01 | 16.93 | 108.35 |
| 6 | 2 | 1 | 0 | | 1.97 | 27.22 | 81.66 |
| 7 | 3 | 1 | 0 | | 1.85 | 24.33 | 97.32 |
| 8 | 2 | 1 | 4 × 10⁻³/0.396 | 165 | 1.83 | 6.60 | 22.44 |
| 9 | 3 | 1 | 4 × 10⁻³/0.396 | | 1.56 | 10.93 | 48.09 |
| 10 | 2 | 1 | 0 | | 2.47 | 33.65 | 100.95 |
| 11 | 3 | 1 | 0 | | 1.90 | 30.76 | 123.04 |
| 12 | 2 | 1 | 0 | 180 | 1.41 | 26.43 | 79.29 |

Figure 3:
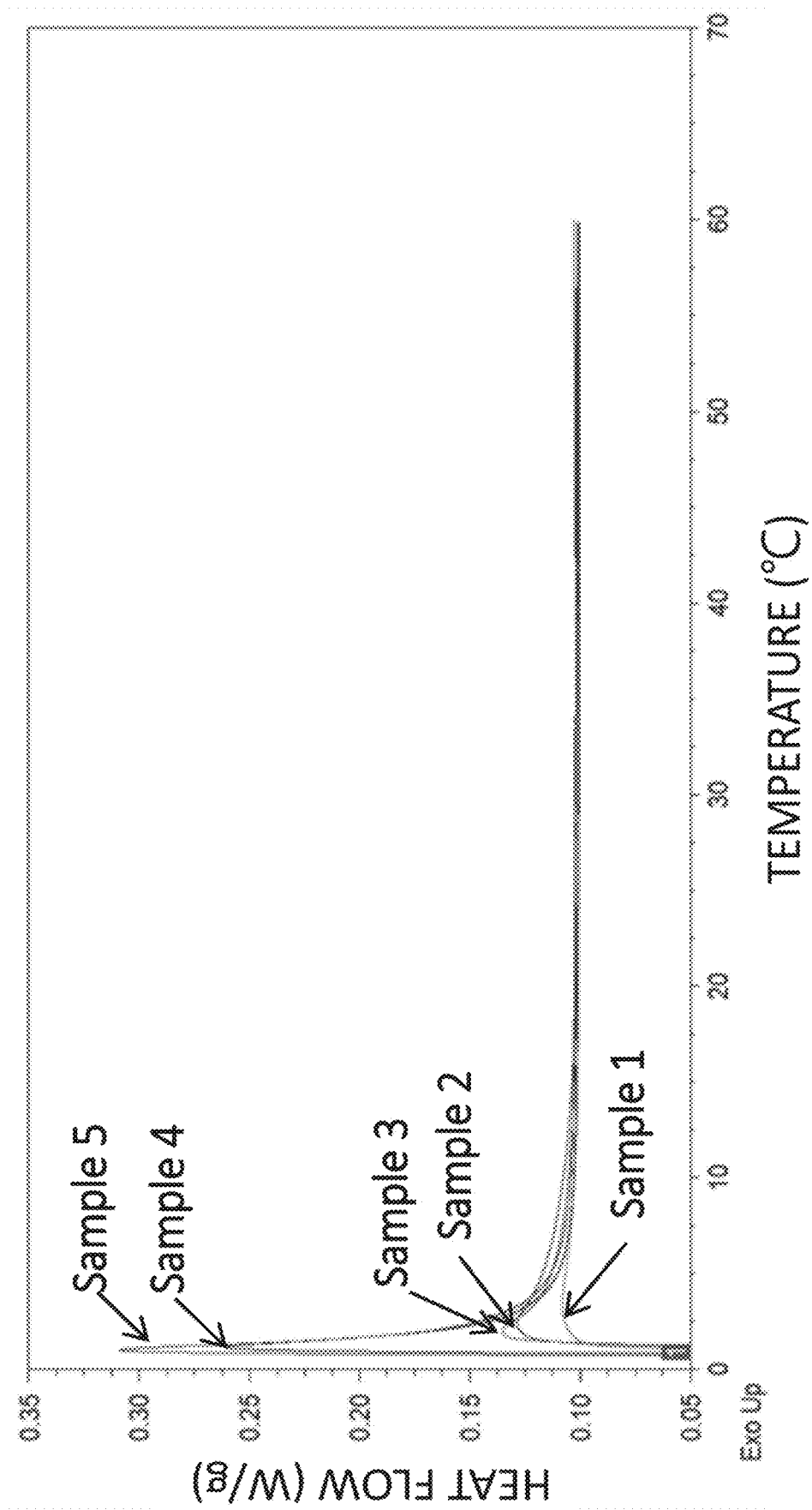
FIG. 3 is a graph showing comparison of constant temperature scanning curves of samples 1 to 5 of the present invention.
Figure 4:
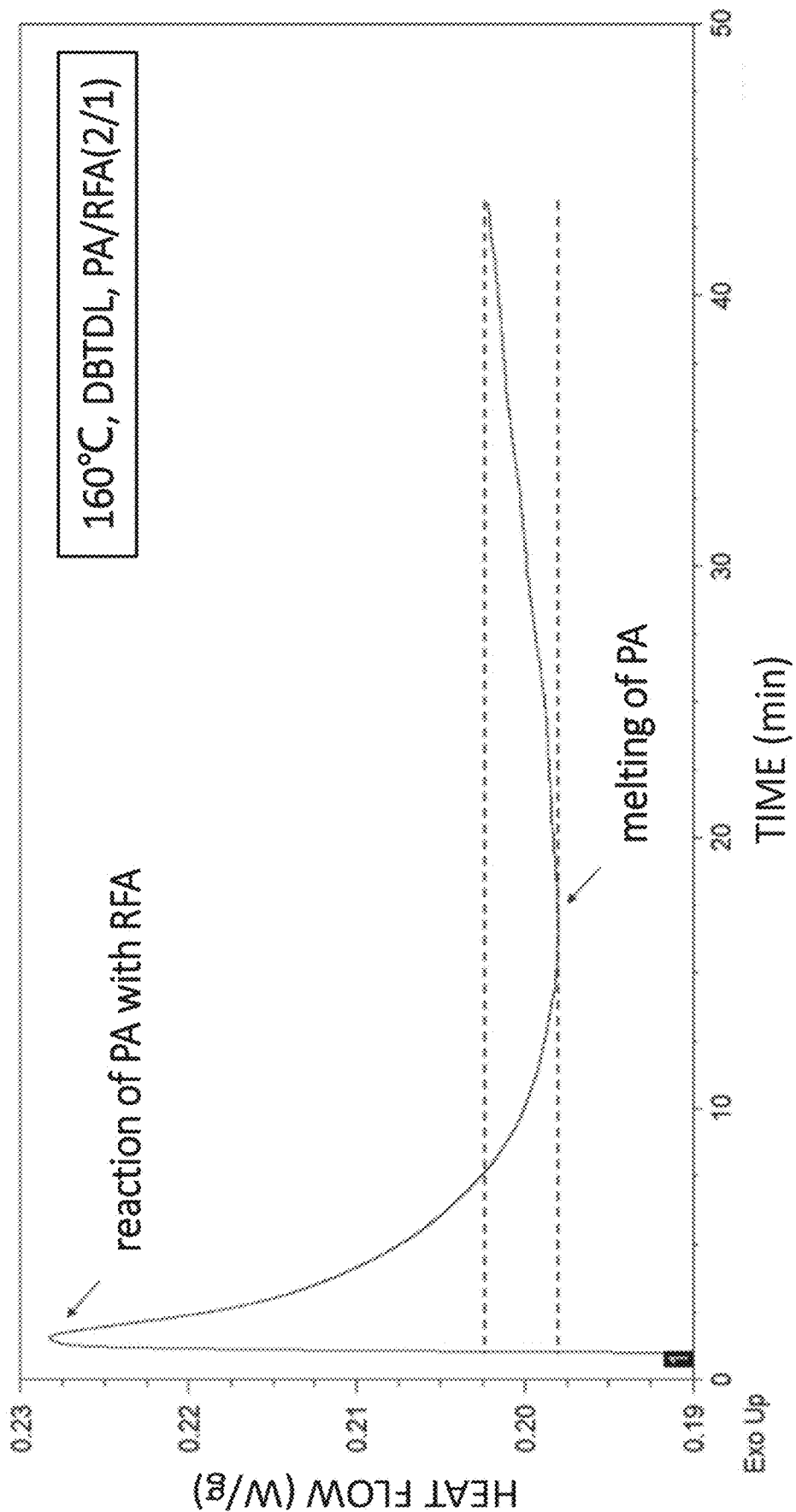
FIG. 4 is a graph showing comparison of constant temperature scanning curves of sample 2 of the present invention.
Figure 5:
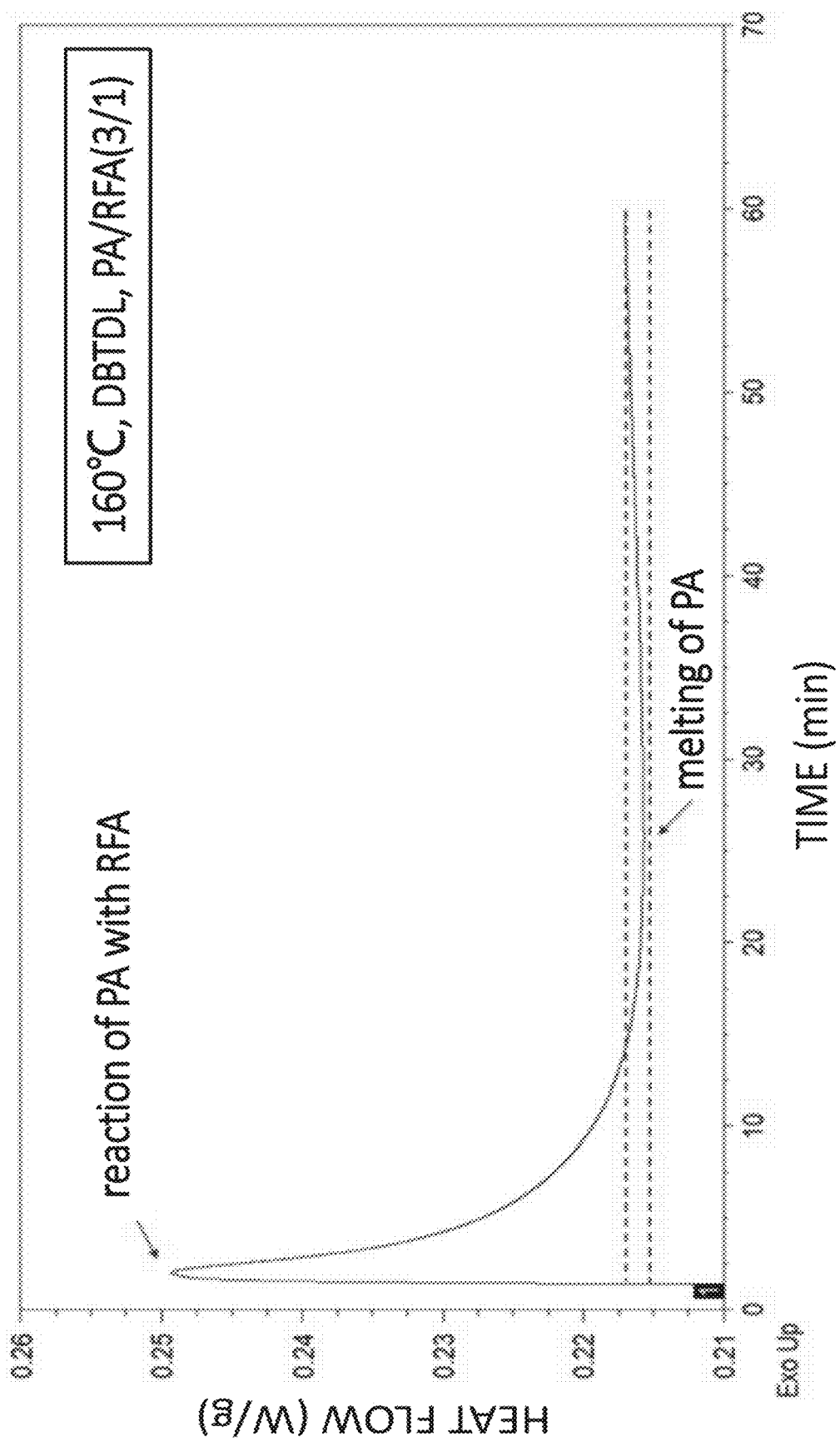
FIG. 5 is a graph showing comparison of constant temperature scanning curves of sample 3 of the present invention.
Figure 6:
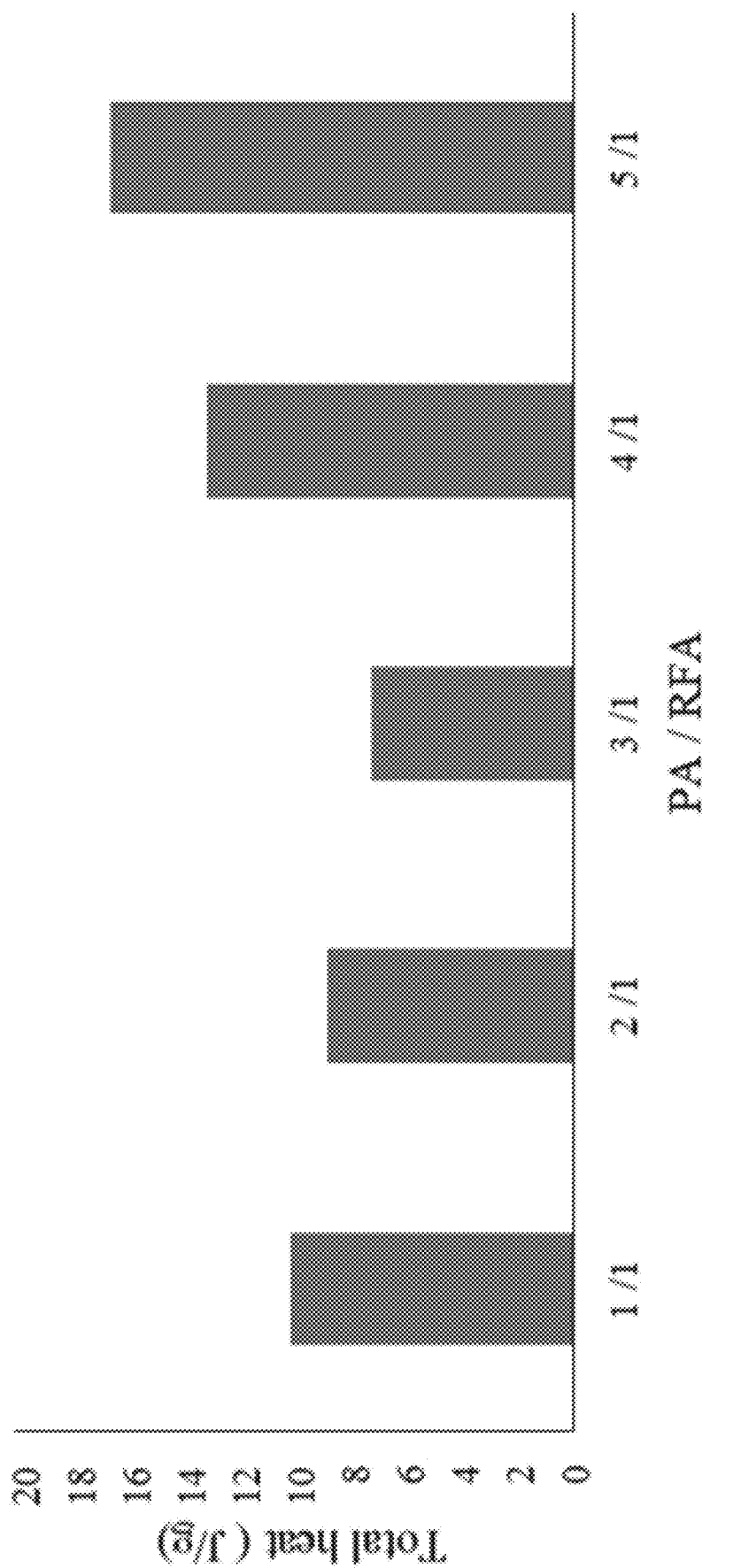
FIG. 6 is a graph showing comparison of the total heat per g sample of a reaction between PA-12 and H12-MDI in samples 1 to 5 of the present invention.

[a]Total heat per g sample (PA-12 + $H_{12}$MDI)
[b]Total heat per g $H_{12}$MDI
[c]The fusion phenomenon observed from the DSC curve FIG. 3 is a graph showing comparison of constant temperature scanning curves of samples 1 to 5. It can be seen from FIG. 3 that PA-12 and $H_{12}$-MDI may exhibit a rapid exothermic reaction in a case that a catalyst is added. In addition, during separate observation of the graph showing comparison of constant temperature scanning curves of samples 1 to 5, it can be observed that a part of PA-12 in samples 2 and 3 after the exothermic reaction is fused, as shown in FIGS. 4 and 5, respectively. Furthermore, FIG. 6 shows the total heat per g sample (PA-12+$H_{12}$MDI) in samples 1 to 5, the total heat per g sample in samples 2 and 3 are 9.01 J/g and 7.47 J/g, and the total heat per g sample in samples 1, 4, and 5 are 10.39 J/g, 13.47 J/g, and 16.93 J/g, respectively. In view of the above, the reaction of PA-12 and $H_{12}$-MDI in samples 2 and 3 is interfered by the fusion of PA-12 and exhibits a low total heat per g sample. However, this phenomenon has not been observed in samples 1, 4, and 5. Therefore, the weight ratio of PA-12/$H_{12}$-MDI plays an important role when PA-12 powder is used as the component of the first composition. Preferably, a formula of PA-12/$H_{12}$-MDI=2/1 or 3/1 is used.

Figure 7:
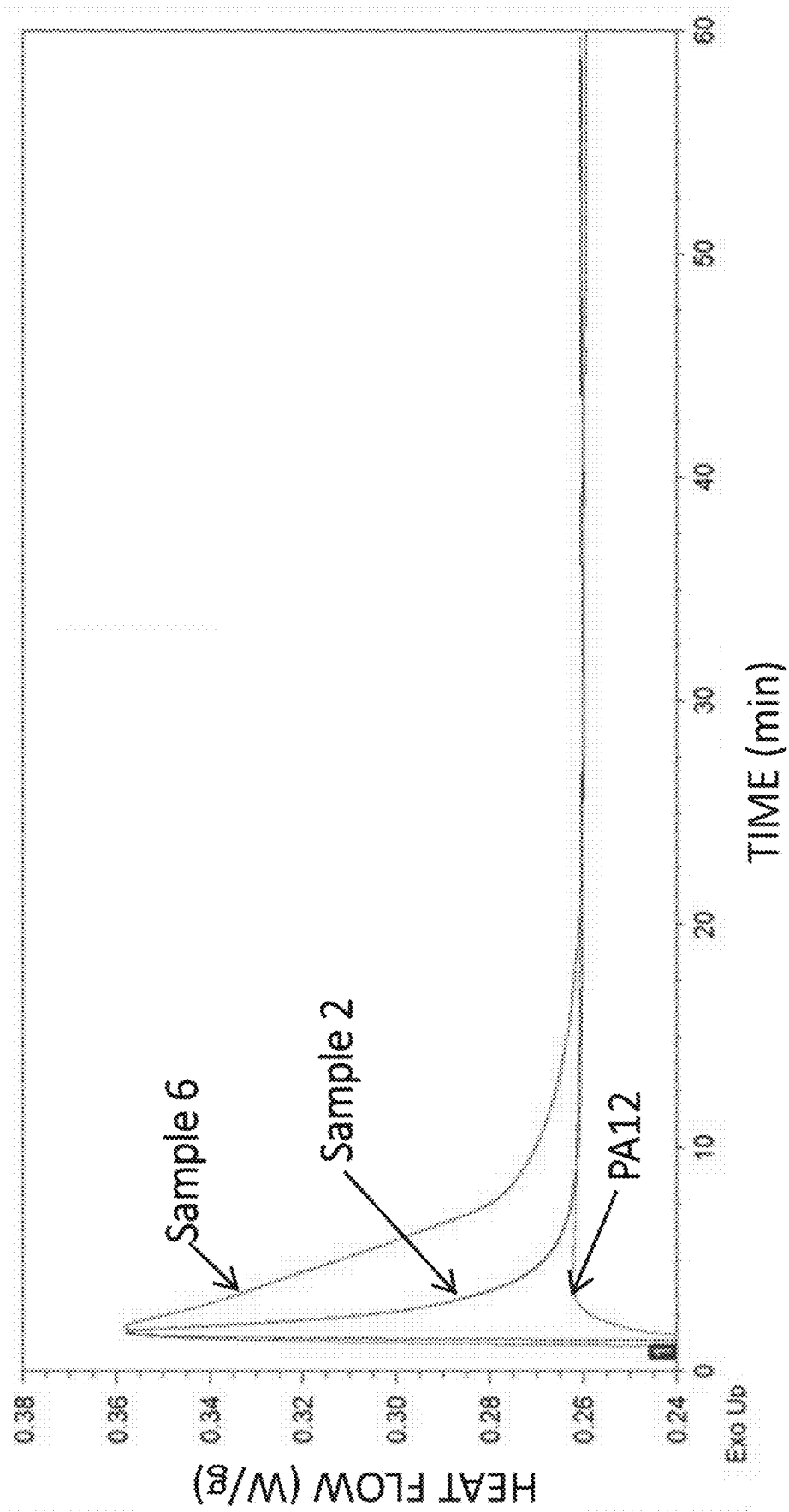
FIG. 7 is a graph showing comparison of constant temperature scanning curves of samples 2 and 6 of the present invention.
Figure 8:
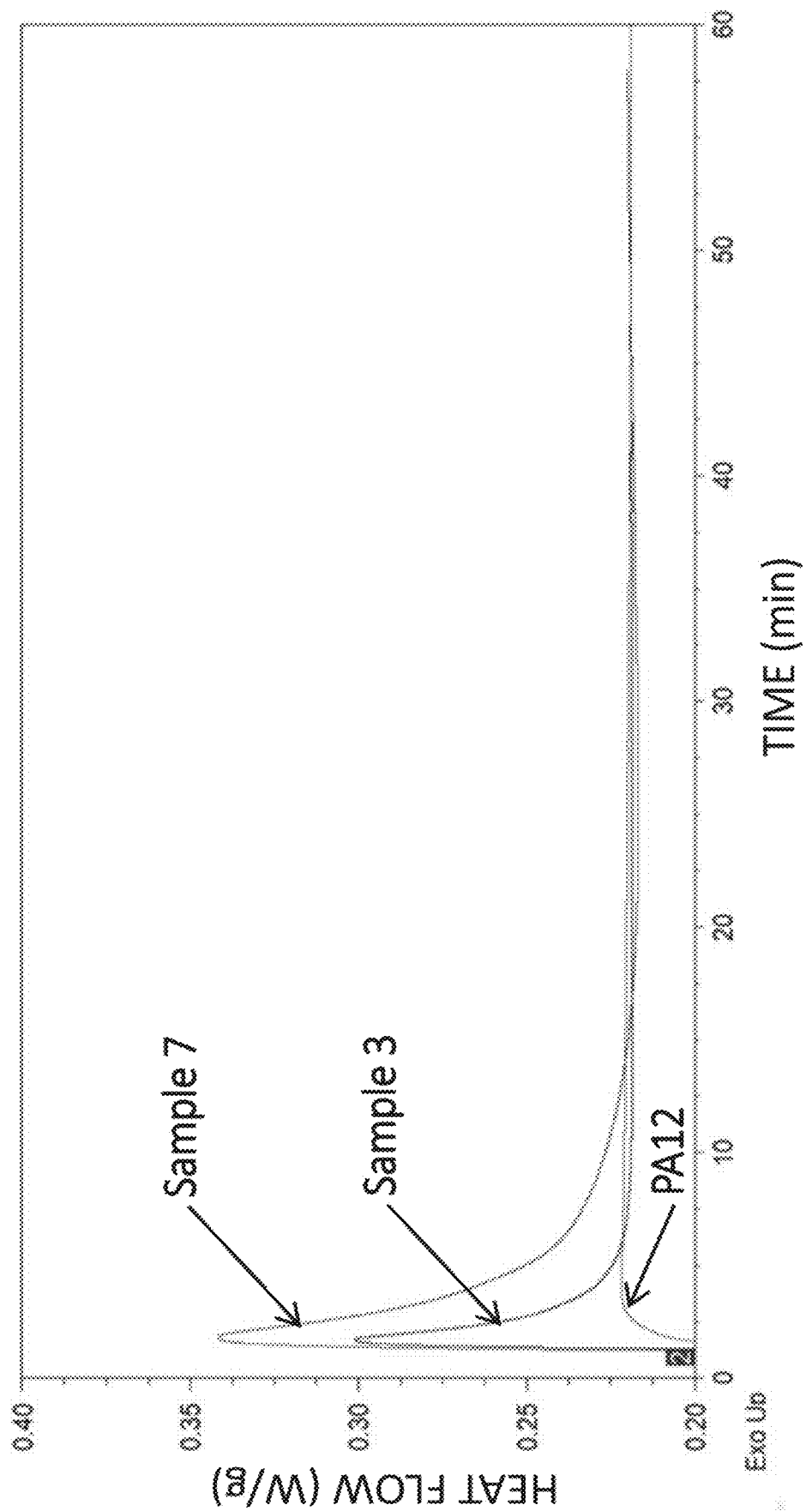
FIG. 8 is a graph showing comparison of constant temperature scanning curves of samples 3 and 7 of the present invention.
Figure 9:
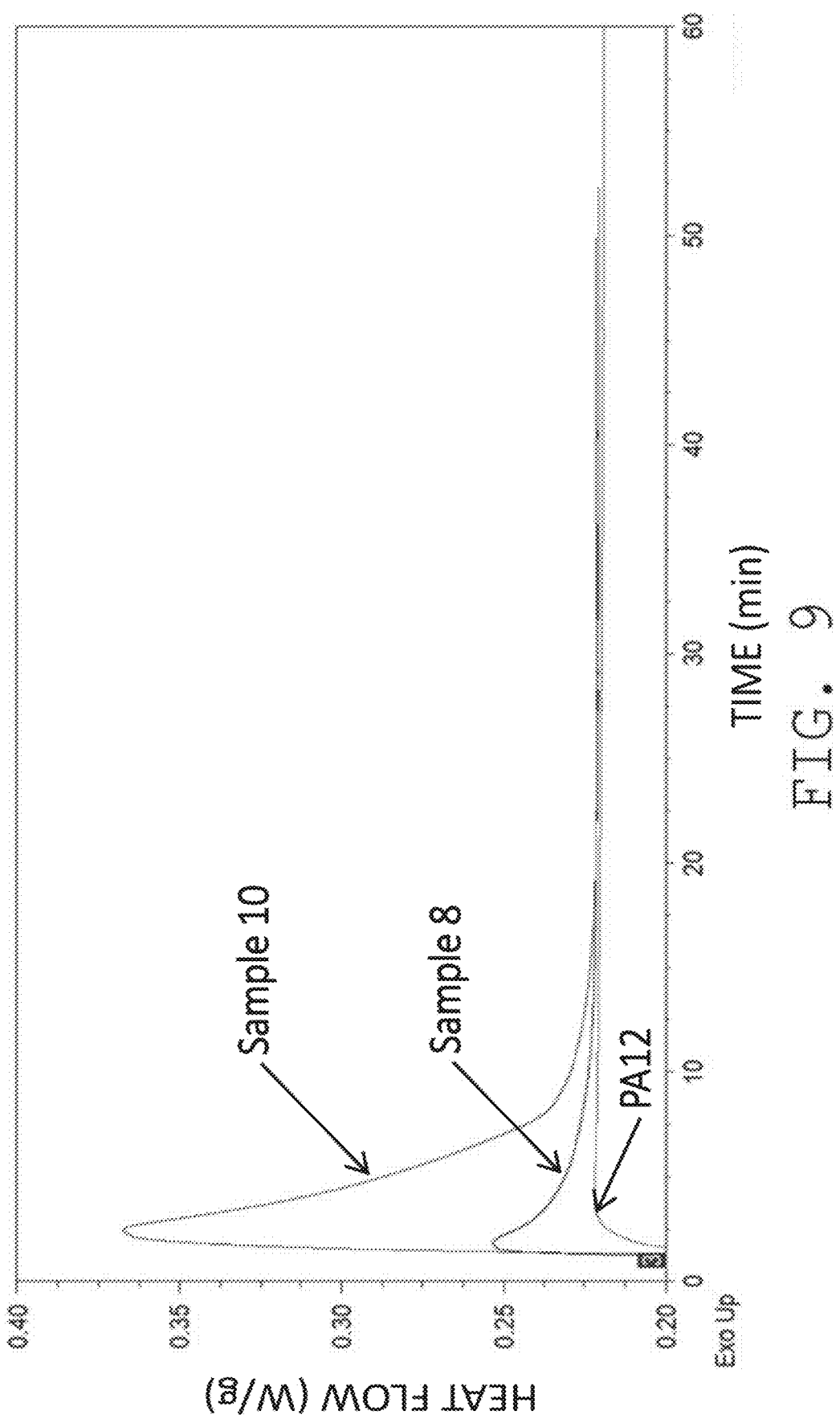
FIG. 9 is a graph showing comparison of constant temperature scanning curves of samples 8 and 10 of the present invention.
Figure 10:
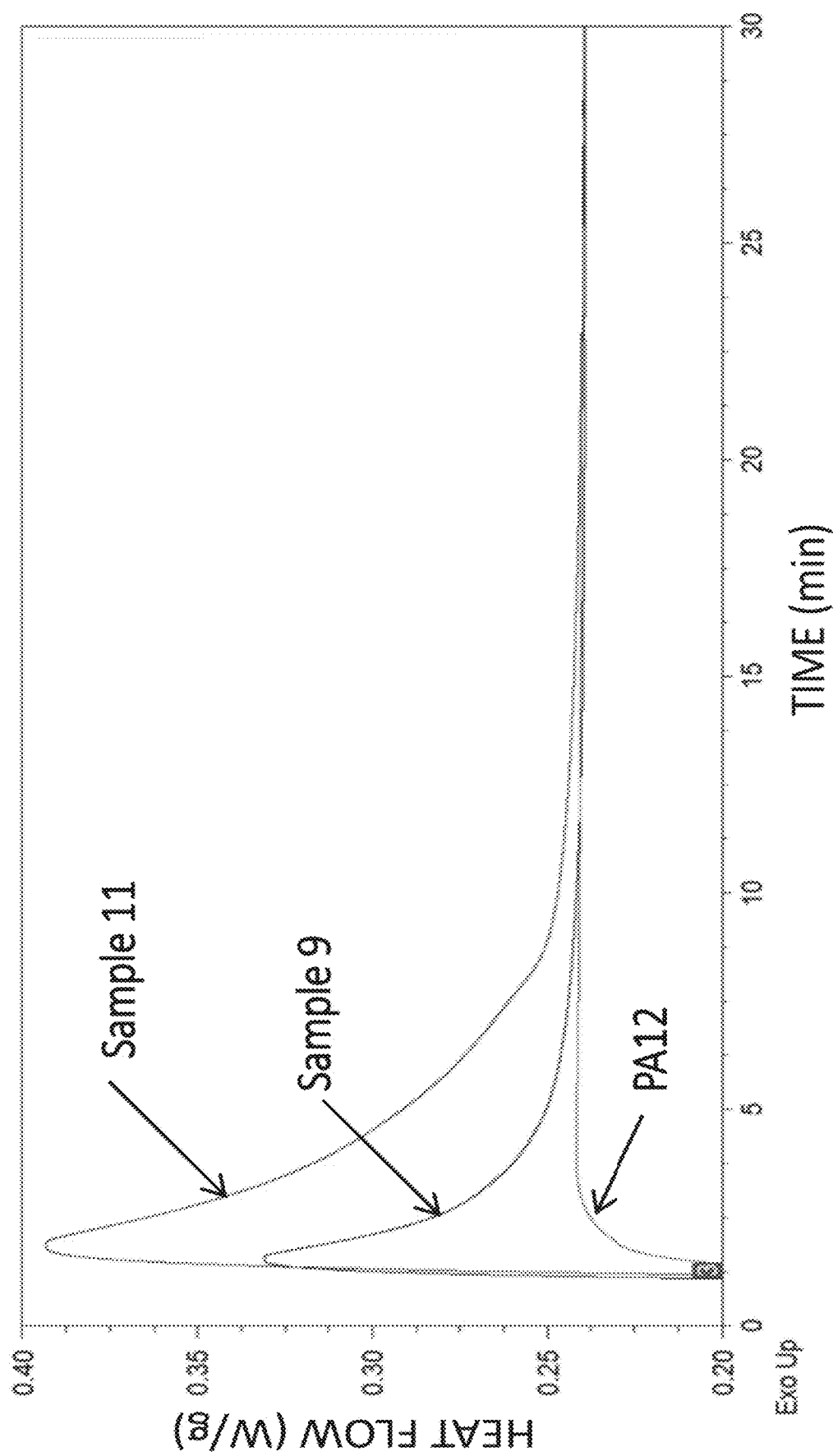
FIG. 10 is a graph showing comparison of constant temperature scanning curves of samples 9 and 10 of the present invention.

Next, FIG. 7 is a graph showing comparison of constant temperature scanning curves of 100% PA-12, sample 2, and sample 6. It can be seen from FIG. 7 that in the absence of $H_{12}$-MDI, PA-12 does not have any chemical reaction at 160° C. In addition, in sample 2 added with DBTDL/NMP, the total heat released by the reaction of PA-12 with $H_{12}$-MDI is smaller than that of sample 6 without adding DBTDL/NMP, but the reaction rate of sample 2 is lower than that of sample 6 without adding DBTDL/NMP, which may be caused by the interference of part of the PA-12 fusion phenomenon. This phenomenon is observed in the graph showing comparison of constant temperature scanning curves of samples 3 and 7 as shown in FIG. 8, the graph showing comparison of constant temperature scanning curves of samples 8 and 10 as shown in FIG. 9, and the graph showing comparison of constant temperature scanning curves of samples 9 and 11 as shown in FIG. 10, showing that the addition of catalyst (DBTDL/NMP) on the reaction effect of PA-12 and $H_{12}$-MDI may not be affected by the ratio of PA-12 to $H_{12}$-MDI or the reaction temperature, and thus the reaction rate can be effectively improved.

Figure 11:
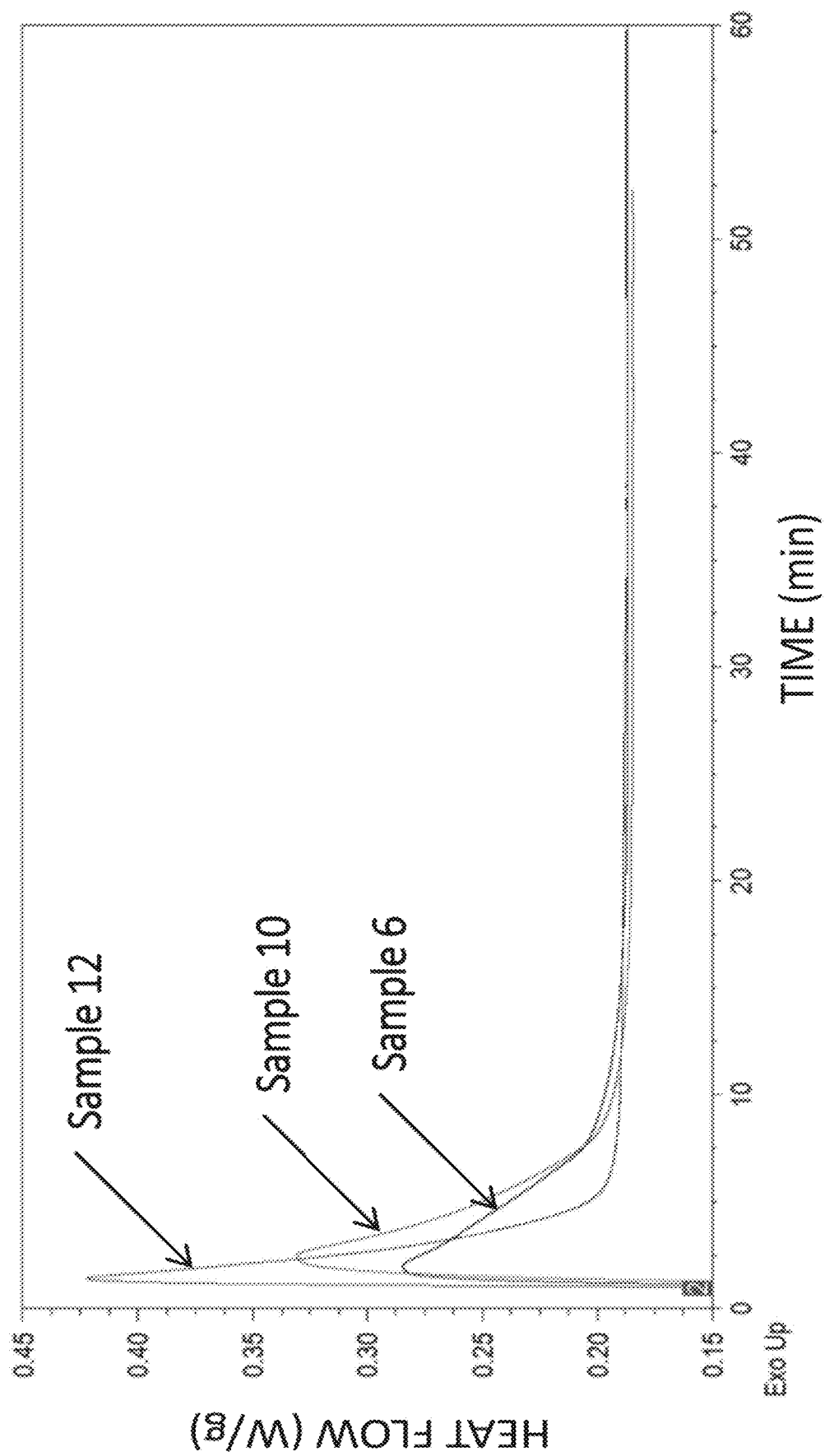
FIG. 11 is a graph showing comparison of constant temperature scanning curves of samples 6, 10, and 12 of the present invention.

Furthermore, FIG. 11 is a graph showing comparison of constant temperature scanning curves of samples 6, 10, and 12. It can be seen from FIG. 11 that in samples 6, 10, and 12, sample 12 has the fastest reaction, sample 10 is the second, and sample 6 is the slowest. Therefore, without the addition of catalyst (DBTDL/NMP), the reaction rate of PA-12 and $H_{12}$-MDI in the same proportion may increase with the increase of the reaction temperature.

"Non-constant temperature scanning analysis of a second composition containing a catalyst and polyamide PA-12 powder"

PA-12, $H_{12}$-MDI, and N-methylpyrrolidone (NMP) containing dibutyltin dilaurate (DBTDL) are uniformly mixed at the weight ratio shown in Table 3, and non-constant temperature scanning is performed with a Differential Scanning calorimetry (DSC), and the data results obtained are recorded in Table 3.

TABLE 3

| | Composition (weight ratio) | | | Exothermic | | | | Endothermic | | Total |
|---|---|---|---|---|---|---|---|---|---|---|
| Sample | PA-12 | H$_{12}$MDI | Second composition DBTDL/NMP | Onset T (° C.) | Peak T (° C.) | Heat$^a$ (J/g) | Heat$^b$ (J/g) | Onset T (° C.) | Peak T (° C.) | melting heat (J/g) |
| 13 | 2 | 1 | 0 | 103.18 | 130.89 | 11.02 | 33.06 | 149.84 | 166.68 | 66.75 |
| 14 | 2 | 1 | 4 × 10$^{-3}$/0.396 | 61.53 | 98.75 | 62.87 | 213.76 | 141.88 | 163.65 | 64.36 |
| 15 | 3 | 1 | 0 | 101.06 | 132.62 | 18.61 | 74.44 | 150.13 | 168.09 | 72.61 |
| 16 | 3 | 1 | 4 × 10$^{-3}$/0.396 | 62.31 | 98.45 | 47.77 | 210.19 | 146.65 | 167.39 | 83.48 |

Figure 12:
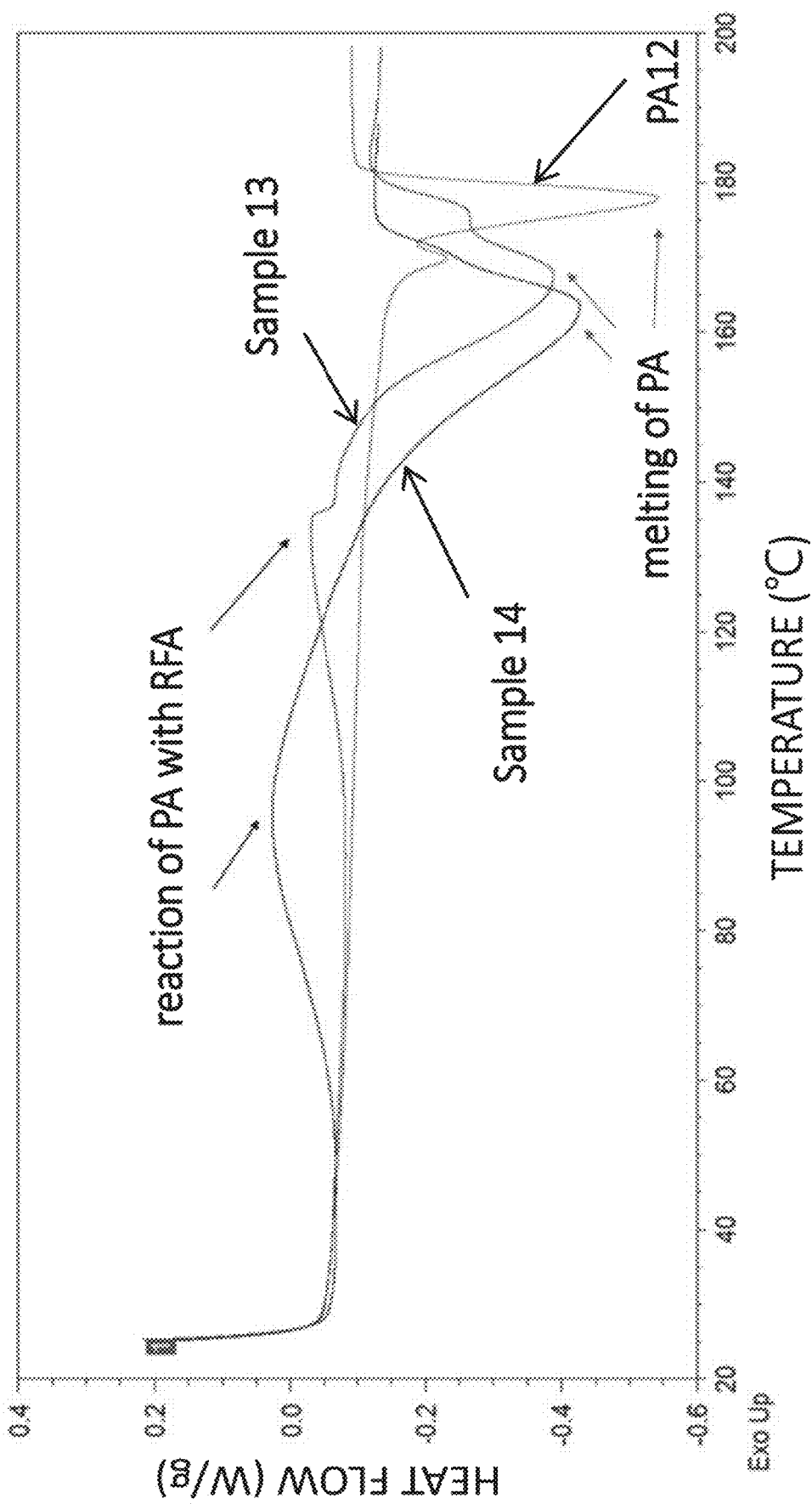
FIG. 12 is a graph showing comparison of non-constant temperature scanning curves of samples 13 and 14 of the present invention.
Figure 13:
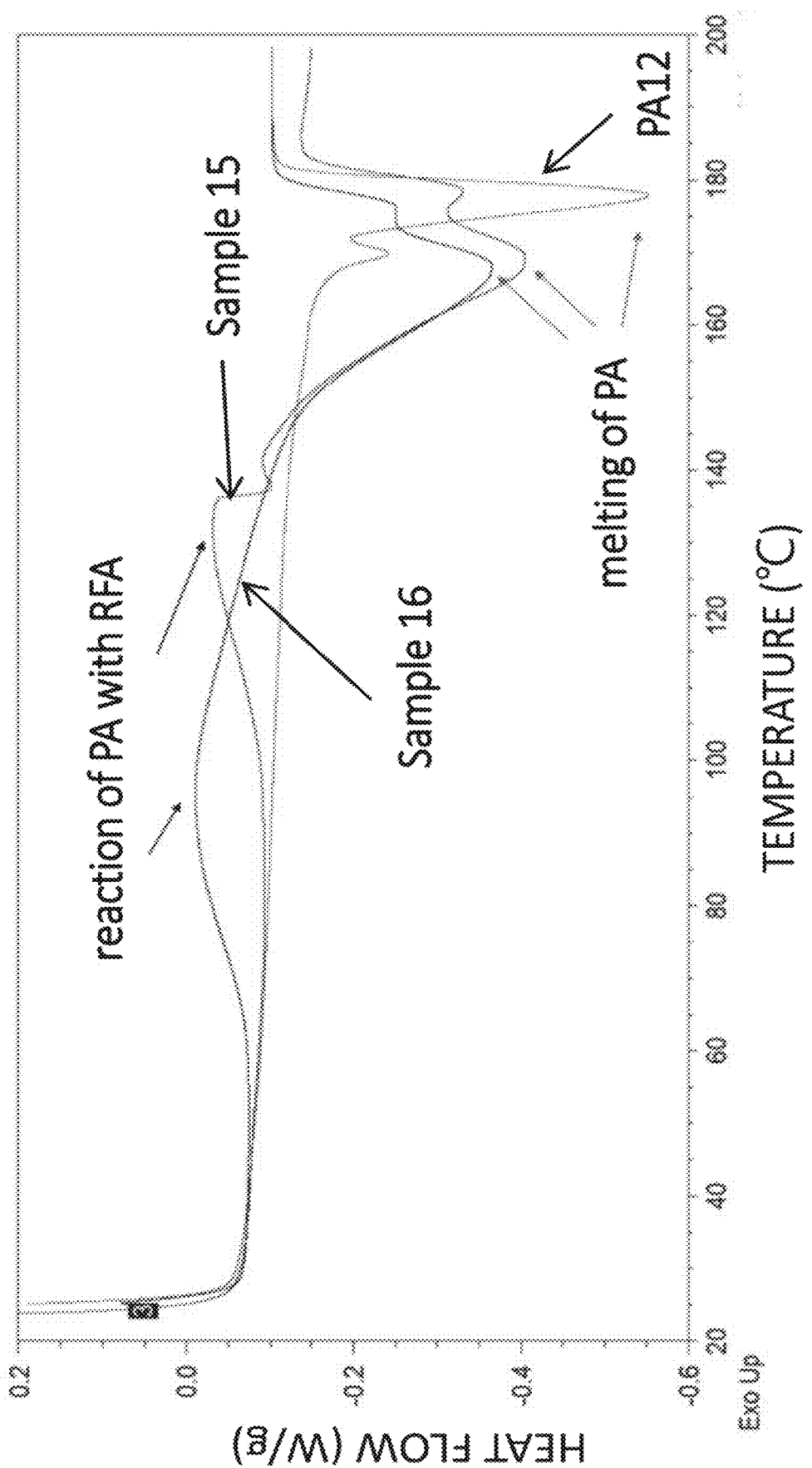
FIG. 13 is a graph showing comparison of constant temperature scanning curves of samples 15 and 16 of the present invention.

$^a$Total heat per g sample (PA-12 + H$_{12}$MDI)
$^b$Total heat per g H$_{12}$MDI Refer to the data in Table 3 in conjunction with FIGS. 12 and 13, FIG. 12 is a graph showing comparison of non-constant temperature scanning curves of samples 13 and 14, and FIG. 13 is a graph showing comparison of non-constant temperature scanning curves of samples 15 and 16.

It can be seen from Table 3 and FIGS. 12 and 13 that samples 14 and 16 added with the catalyst (DBTDL/NMP) exhibit a rapid exothermic reaction, and the onset temperature and the peak temperature of the exothermic reaction is far lower than those of samples 13 and 15 without catalyst. In addition, it can also be observed from the data results in Table 3 that the total heat per g sample of samples 14 and 16 with catalyst is also much greater than that of samples 13 and 15 without catalyst. These experimental data show that the addition of the catalyst (DBTDL/NMP) helps increase the 3D inkjet printing speed.

Furthermore, it is worth noting that the starting melting temperature of PA-12 in samples 14 and 16 with catalyst is lower than that of samples 13 and 15 without catalyst. This result confirms that the presence of a catalyst can be used to control the mechanical properties of polymers.

"Constant temperature scanning analysis of a second composition containing a physical property modifier and polyamide PA-12 powder"

PA-12, H$_{12}$-MDI, and PEG-400 are uniformly mixed in the weight ratio shown in Table 4, and constant temperature scanning is performed with a Differential Scanning calorimetry (DSC) under the temperature condition shown in Table 4, and then the exothermic peak time and the total heat per g sample of each sample are recorded in Table 4.

Figure 14:
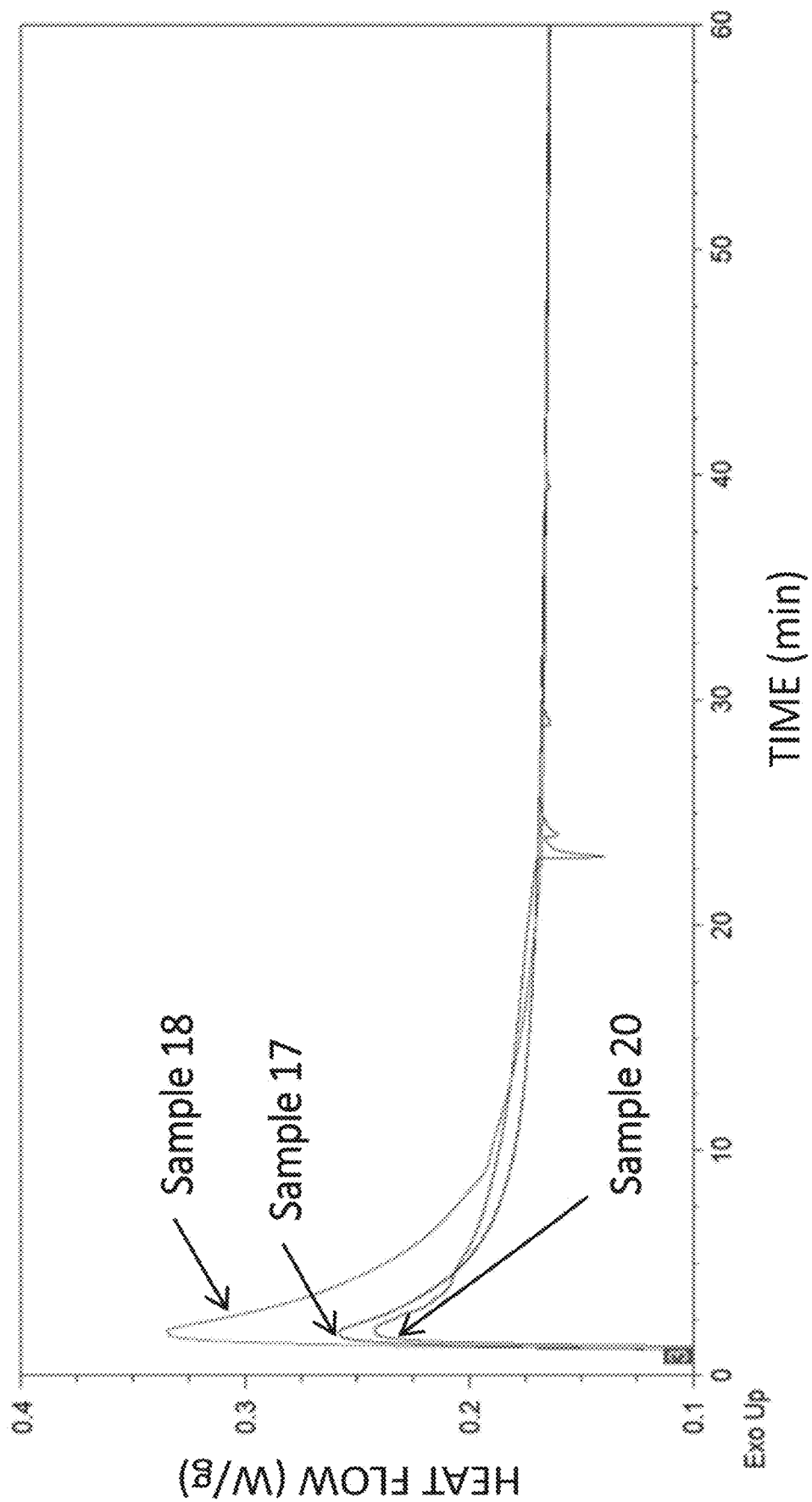
FIG. 14 is a graph showing comparison of constant temperature scanning curves of samples 17, 18, and 20 of the present invention.
Figure 15:
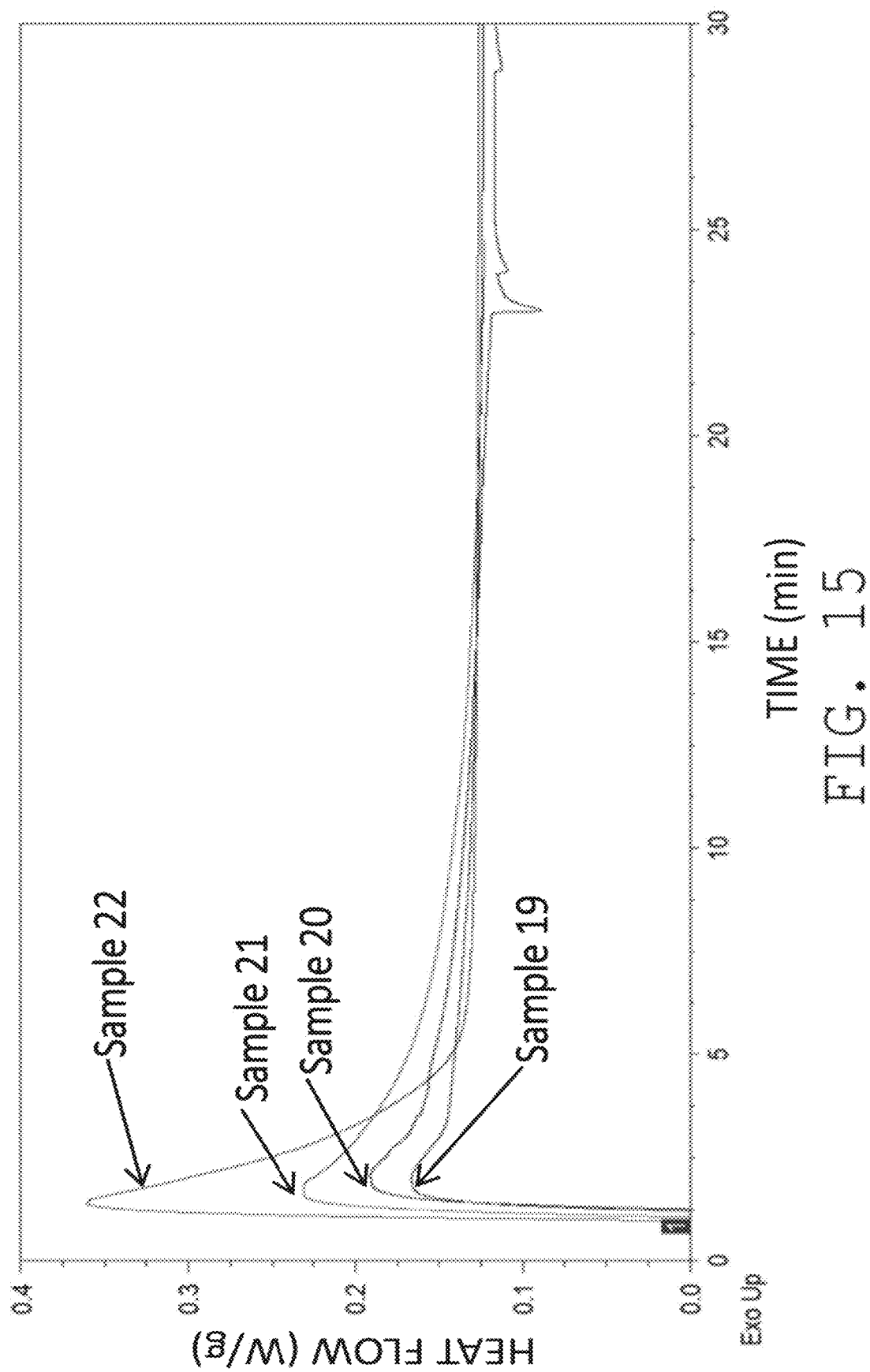
FIG. 15 is a graph showing comparison of constant temperature scanning curves of samples 19 to 22 of the present invention.

Refer to the data in Table 4 in conjunction with FIGS. 14 and 15, FIG. 14 is a graph showing comparison of constant temperature scanning curves of samples 17, 18 and 20, and FIG. 15 is a graph showing comparison of constant temperature scanning curves of samples 19 to 22.

It can be seen from Table 4 and FIG. 14 that the exothermic peak times of samples 17, 18, and 20 are 1.92 min, 1.97 min, and 1.99 min, respectively, indicating that the reaction proceeds within 2 min without the addition of catalyst. In addition, the total heat per g sample of sample 20 is 22.94 J/g, which is significantly lower than 36.91 J/g of sample 17 and 49.27 J/g of sample 18, this may be caused by the interference of part of PA-12 fusion.

Furthermore, it can be seen from Table 4 and FIG. 15 that compared with the results of sample 22, the reaction rates of samples 19 to 21 are lower, and as the content of PPG-400 increases, the reaction rate and the total heat per g sample decrease significantly.

Next, the appearances of the molded products of samples 17 to 22 after the reaction are observed. The molded products of samples 17 and 18 have loose structures and cannot be extended. However, under the same temperature condition (180° C.), the extensibility of samples 19 to 22 after the reaction may increase as the content of PEG-400 increases. In view of the above, further adding a physical property modifier (such as PEG-400) to the second composition can change the physical properties of the sample, thereby printing a multi-purpose composite polymer material.

"Constant temperature scanning analysis of a second composition containing a catalyst and thermoplastic polyurethane TPU (powder)"

TABLE 4

| | Composition (weight ratio) | | | | Peak | | |
|---|---|---|---|---|---|---|---|
| Sample | PA-12 | H$_{12}$-MDI | PPG-400 | Temperature (° C.) | time (min) | Heat (J/g)$^a$ | Heat (J/g)$^b$ |
| 17 | 2 | 0.40 | 0.60 | 160 | 1.92 | 36.91 | 110.73 |
| 18 | 2 | 0.40 | 0.60 | 165 | 1.97 | 49.27 | 147.81 |
| 19 | 2 | 0.24 | 0.76 | 180 | 1.99 | 12.68 | 38.04 |
| 20 | 2 | 0.40 | 0.60 | | 2.05 | 22.94 | 68.82 |
| 21 | 2 | 0.56 | 0.44 | | 1.77 | 25.68 | 77.04 |
| 22 | 2 | 1 | 0 | | 1.41 | 26.43 | 79.29 |

$^a$Total heat per g sample (PA-12 + H$_{12}$MDI + PPG-400)
$^b$Total heat per g H$_{12}$MDI + PPG-400

Figure 16:
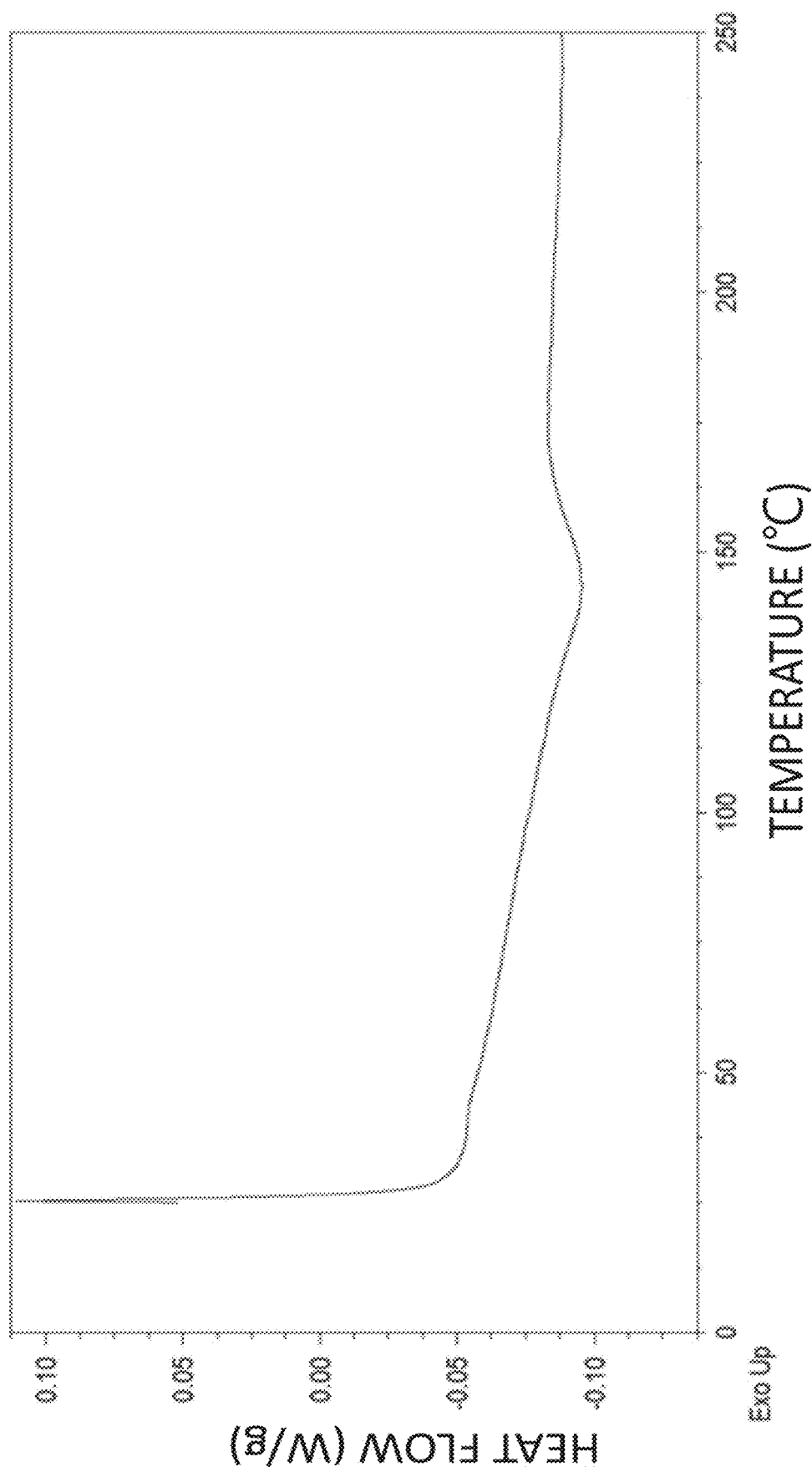
FIG. 16 is a graph showing comparison of non-constant temperature scanning curves of TPU in an example of the present invention.

First, the melting point of the TPU polymer powder used in the present invention is confirmed. Non-constant temperature scanning is performed on the TPU powder using the Differential Scanning calorimetry (DSC), the heating scanning speed used is 5° C./min, and scanning from room temperature to 250° C. necessarily requires annealing heat treatment of a sample under the same conditions. The non-constant scanning DSC curve graph of TPU is as shown in FIG. 16. The thermal property data of the TPU obtained after the sample is annealed are recorded in Table 5.

TABLE 5

| Sample | Onset Tm (° C.) | Peak Tm (° C.) | Total melting heat (J/g) |
|---|---|---|---|
| TPU | 113 | 143 | 6.16 |

Figure 17:
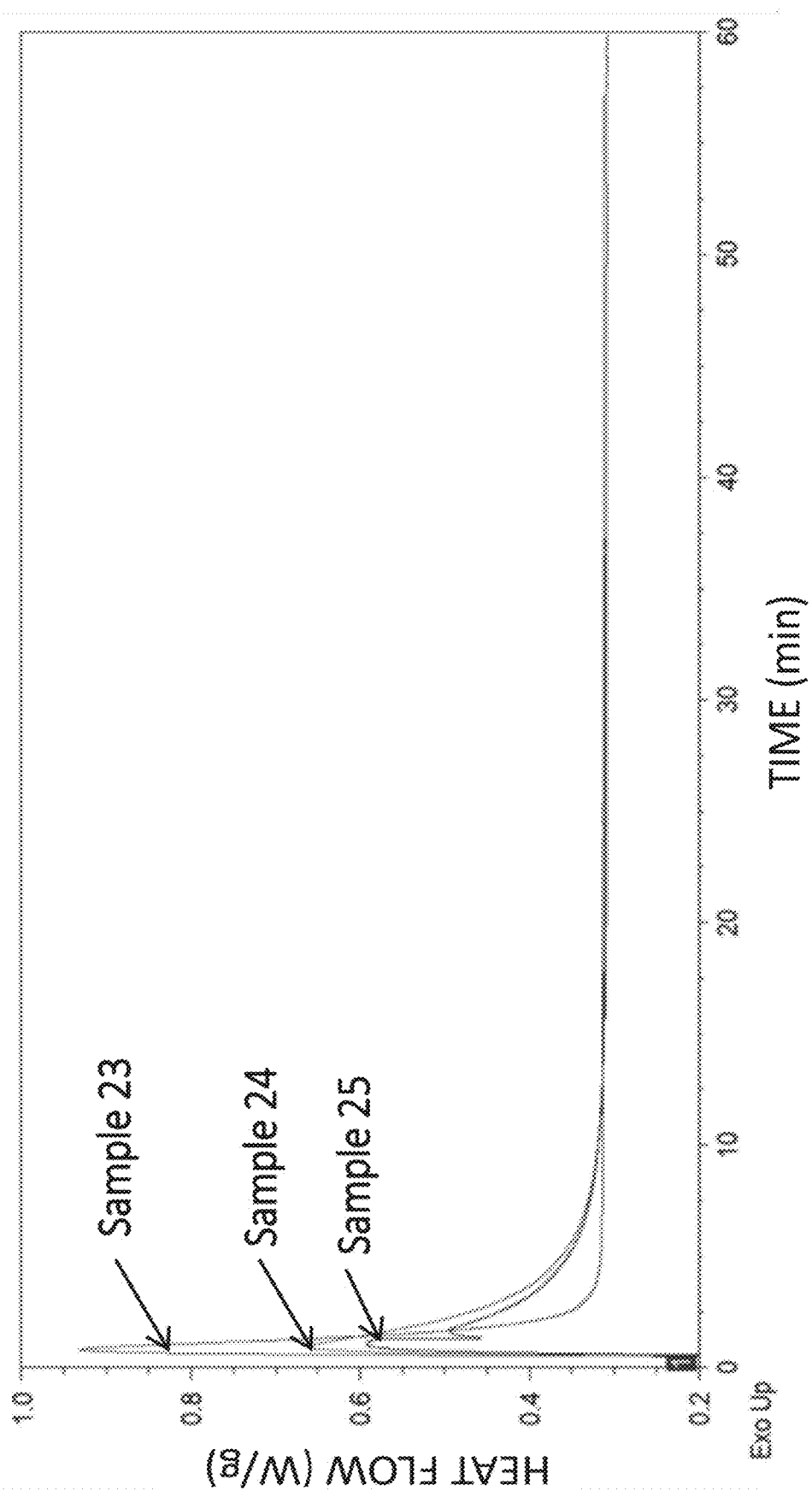
FIG. 17 is a graph showing comparison of constant temperature scanning curves of samples 23, 24, and 25 of the present invention.

It can be seen from the analysis of thermal properties in Table 5 and FIG. 17 that the melting point of TPU is about 143° C. The experimental results in this part can help design the sample preheating temperature used in the 3D printing process. Therefore, the subsequent analysis of the exothermic polymerization reaction between the TPU powder and the second composition is performed using 90° C. as the first temperature.

TPU, $H_{12}$-MDI, and N-methylpyrrolidone (NMP) containing dibutyltin dilaurate (DBTDL) are uniformly mixed at the weight ratio shown in Table 6, and constant temperature scanning is performed with a Differential Scanning calorimetry (DSC) under the temperature condition (90° C.), and the exothermic peak time of each sample and the Total heat per g sample of the sample are recorded in Table 6.

TABLE 6

| Sample | Composition (weight ratio) Second composition | | | T (° C.) | Peak time (min) | Heat (J/g)$^a$ | Heat (J/g)$^b$ |
|---|---|---|---|---|---|---|---|
| | TPU | $H_{12}$MDI | DBTDL/NMP | | | | |
| 23 | 1 | 1 | 4 × 10$^{-3}$/0.396 | 90 | 0.80 | 36.49 | 87.58 |
| 24 | 2 | 1 | 4 × 10$^{-3}$/0.396 | | 0.93 | 52.17 | 177.38 |
| 25 | 3 | 1 | 4 × 10$^{-3}$/0.396 | | 1.07 | 42.31 | 186.16 |

$^a$Total heat per g sample (TPU + $H_{12}$MDI)
$^b$Total heat per g $H_{12}$MDI Refer to the data in Table 6 in conjunction with FIG. 17, FIG. 17 is a graph showing comparison of constant temperature scanning curves of samples 23, 24, and 25.

It can be seen from Table 6 and FIG. 17 that the exothermic peak times of samples 23, 24, and 25 are 0.8 min, 0.93 min, and 1.07 min, respectively, which are shorter than the reaction times of samples 1 to 22 with PA-12 and $H_{12}$-MDI, and the required reaction temperature is lower, indicating that the effect of TPU and $H_{12}$-MDI is better than that of PA-12 and $H_{12}$-MDI when the catalyst is added, and it saves more energy.

Then, the 3D inkjet printing test of the present invention is carried out based on the above analysis results.

"Preparation Examples 1 to 4" (Preparation of the second composition)

$H_{12}$-MDI, MEK, N-methylpyrrolidone (NMP) containing 1% of dibutyltin dilaurate (DBTDL), and PEG-400 are uniformly mixed in the weight percentages as shown in Table 7, to obtain the second compositions P1, P2, P3, and P4, respectively.

TABLE 7

| | | Preparation example 1 | Preparation example 2 |
|---|---|---|---|
| Second composition | | P1 | P2 |
| $H_{12}$-MDI (wt %) | | 30 | 15 |
| MEK (wt %) | | 70 | 70 |
| 1% DBTDL/NMP (wt %) | | 0 | 0 |
| PEG-400 (wt %) | | 0 | 15 |
| physical properties | Viscosity (cP) | 1.59 | 0.66 |

Examples 1 and 2

Polyamide 12 (PA-12 for short, supplier: Sinterit; model: PA12 Smooth; the powder contains carbon black with a particle size ranging from 20 μm to 100 μm, an average particle size of 38 μm, the melting point of 182° C., and the softening point of 170° C.) used in Examples 1 and 2 is used as a component of the first composition. The 3D printer machine used is modified based on the ComeTrue T10 machine system of Microjet Technology Co., Ltd., and the printing module uses the thermal bubble inkjet technology, Xinglitai Company's ST-201 fixed ink-jet printer is used as a driver, in conjunction with the SINLETAL INK 51645A thermal bubble print head ink cartridge integrated with a thermal bubble print head and an ink cartridge, and four near-infrared light heaters (the voltage of 110 V, the max power of 1 kW, the wavelength of 1 μm, and the effective heating zone length of 80 mm) for heating.

The PA-12 is placed on a molding platform of the 3D printer machine, and the roller is rolled back and forth to make the PA-12 form a main body layer with a uniform thickness. The thickness and unit density of the main body layer are as shown in Table 8. Then, the main body layer is heated to the first temperature shown in Table 8 with the near-infrared light heater.

Next, the second composition as shown in Table 8 is uniformly sprayed onto a specific zone on the surface of the main body layer with a thermal bubble print head to carry out exothermic cross-linking polymerization. The area of the specific zone is 25 mm×25 mm, the spray amount is 20 mg, and the weight ratio of PA-12 to $H_{12}$-MDI in the second composition (PA-12:$H_{12}$-MDI) in the specific zone is 67:33.

After the reaction time shown in Table 8, the specific zone in the main body layer becomes molten, and then the near-infrared light heater is turned off, so that the specific zone is cooled and solidified to form a single-layer 3D object. The finished products S1 to S4 are obtained after the steps above are repeated three times, the printing speed is calculated after the time required to complete the finished products S1 to S4 is recorded respectively, and then the tensile elastic modulus, breaking strength and elongation at break of the finished products S1 to S4 are tested, and then listed in Table 8.

Comparative Example 1

Comparative example 1 uses the same PA-12 in the foregoing Examples 1 and 2 as a component of the first composition for 3D printing, but does not use the second group of compositions P1 or the second composition P2, and the other 3D printing conditions are the same as those in Example 1, and then the finished product T1 is obtained, and the printing speed is calculated after the time required to complete the finished product T1 is recorded. Next, the tensile elastic modulus, breaking strength and elongation at break of the finished product T1 are tested, and then listed in Table 8.

TABLE 8

| | | Comparative example 1 | Example 1 | Example 2 |
|---|---|---|---|---|
| First composition | | PA-12 | PA-12 | PA-12 |
| Second composition | | — | P1 | P2 |
| 3D printing conditions | Thickness of the main body layer (mm) | 0.1 | 0.1 | 0.1 |
| | Unit density of the main body layer (g/cm$^3$) | 0.45 | 0.45 | 0.45 |
| | Printing amount of the second composition | — | 20mg | 20mg |
| | Printing voltage (V) | — | 11.04 | 11.04 |
| | Printing pulse (ps) | — | 4 | 4 |
| | Printing resolution (dpi) | — | 600 | 600 |
| | First temperature (° C.) | 180 | 170 | 170 |
| | Reaction time (s) | 40 | 30 | 30 |
| Printing speed (mm/s) | | — | 15 | 15 |
| Finished products | | T1 | S1 | S2 |
| Mechanical characteristics of the finished products | Elastic modulus (MPa) | 141 | 47 | 68 |
| | Ultimate tensile strength (MPa) | 14.41 | 3.17 | 14.6 |
| | Elongation at break (%) | 10.18 | 6.66 | 21.22 |

Figure 18A:
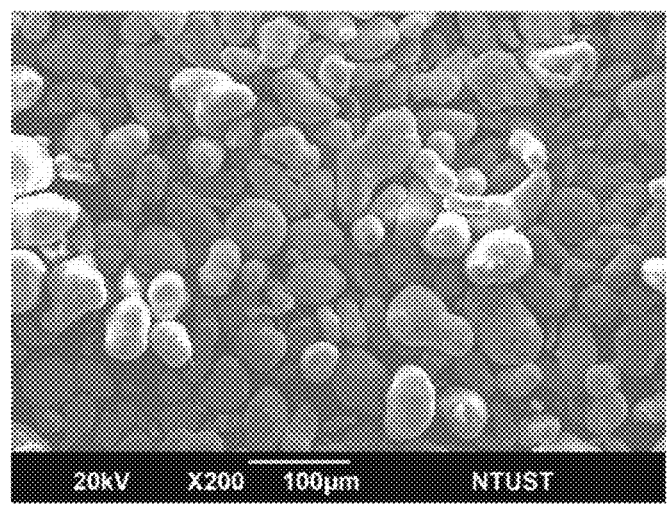
FIGS. 18A to 18C are respectively SEM graphs showing PA12, finished product T1, and finished product S2.
Figure 18B:
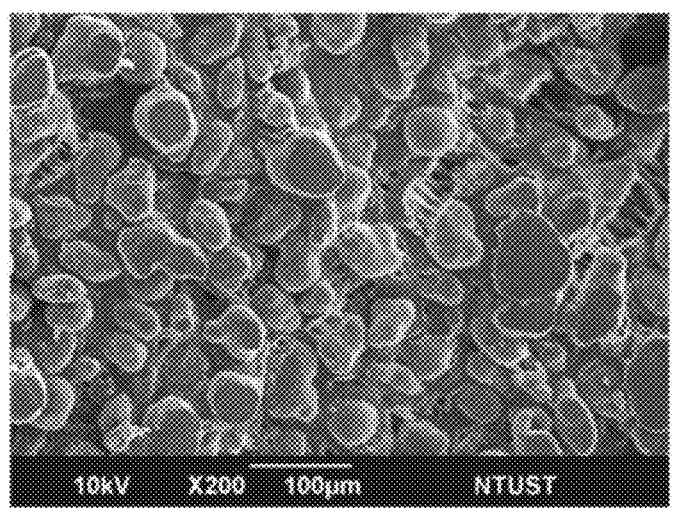
Figure 18C:
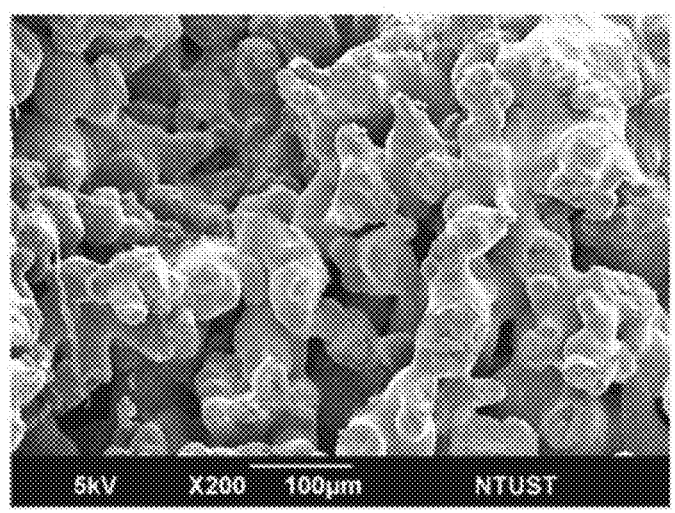

It can be seen from the results in Table 8 above that the ultimate tensile strength of the finished product T1 after molding is 14.41 Mpa, and the tensile elongation is 10.18%; and the ultimate tensile strength of the finished product S2 after molding is 14.6 Mpa, which is similar to the control group, but the tensile elongation rate of the finished product S2 is 21.22%, which is increased significantly by about 208% compared with the control group. In addition, the ultimate tensile strength of the finished product S1 after forming is 3.17 Mpa, which is decreased by about 78% compared with the finished product T1, and the tensile elongation of sample 22 is 6.66%, which is decreased by about 35% compared with the finished product T1. Since the ultimate tensile strength and the tensile elongation of the finished product S1 and the finished product S2 are significantly different, it indicates that further adding a physical property modifier (such as PEG-400) to the second composition can change the physical properties of the sample, so as to produce a multi-purpose composite polymer material by printing. In addition, refer to FIGS. 18A to 18C, FIG. 18A is a SEM graph of PA12 that is not heated, FIG. 18B is a SEM graph of the finished product T1, and FIG. 18C is a SEM graph of the finished product S2. It can be seen from FIG. 18B that the shape of the finished product T1 is similar to the unheated PA12 in FIG. 18A, and there is no obvious sintering. It can be seen from FIG. 18C that the finished product S2 is obviously sintered, which in turn changes the overall mechanical properties.

In addition, Example 1 and Example 2 only require heating to 170° C. for 3D printing, while Comparative Example 1 requires heating to 180° C., indicating that the 3D printing method of the present invention can effectively use the heat of chemical reaction as a part of the heat source to melt the main body layer, thereby reducing the heat of the external heating source to achieve the effect of energy saving.

The examples of the present invention are described above with reference to the accompanying drawings, but the present invention is not limited to the above-mentioned specific embodiments. The above-mentioned specific embodiments are only illustrative, rather than restrictive. Under the motivation of the present invention, those of ordinary skill in the art can make many forms without departing from the spirit of the present invention and the protection scope of the claims, and these all fall within the protection of the present invention.

What is claimed is:

1. A method for 3D inkjet printing, comprising:
    a preheating step: using an external heating source to heat a main body layer composed of a first composition to a first temperature, wherein the main body layer has a thickness of 10 μm to 500 μm and a unit density of 0.1 to 1.0 g/cm3, and the first temperature is less than the melting point of the first composition;
    a heating step: applying a second composition to the surface of the main body layer at the first temperature to proceed an exothermic cross-linking polymerization, so that the main body layer is heated to a second temperature to become a molten state, wherein the second temperature is greater than the melting point of the first composition; and
    a cooling step: cooling down the main body layer in the molten state and solidifying to form;
    wherein the first composition comprises at least a compound A, a compound B or a polyamine compound, in which the compound A is a polyamide selected from the group consisting of a semi-crystalline polyamide, preferably polyamide-6 (PA-6), polyamide-66 (PA-66), polyamide-610 (PA-610), polyamide-1010 (PA-1010), polyamide-11 (PA-11), polyamide-12 (PA-12), polyamide-9 (PA-9), polyamide-612 (PA-612), polyamide-121 (PA-121), polyphthalamide (PPA), and polyparaphenylene terephthalamide (PPTA), the compound B is a polyurethane selected from the group consisting of polyurethane (PU), and thermoplastic polyurethane (TPU); the polyamine compound is selected from the group consisting of ethylenediamine, 1,3-propanediamine, 1,4-butanediamine, 1,5-pentanediamine, diethylenetriamine, 1,2-propanediamine, 1,4-diazacycloheptane, and phenylenediamine;
    the second composition comprises at least a compound C selected from the group consisting of toluene diisocyanate (TDI), isophorone diisocyanate (IPDI), diphenyl methane diisocyanate (MDI), dicyclohexylmethane diisocyanate (H12MDI), lysine diisocyanate (LDI), HDI polyisocyanates, 1,3,5-triazine-2,4,6(1H,3H,5H)-trione), 1,3,5-tris(6-isocyanatohexyl), 1,3,5-tris(6-hydroxyhexyl)biuret triisocyanate, potassium cyanate, sodium hydrogenate, and ammonium cyanate, and a weight ratio of the molding material in the main body layer to the compound C is in a range of between 1:1 to 10:1;

the printing method uses the heat of chemical reaction between the first composition and the second composition as a part of a heat source for melting the main body layer, thereby reducing the heat of the external heating source.

2. The method for 3D inkjet printing according to claim 1, wherein a difference between the first temperature and the melting point of the first composition is in a range of 10° C. to 100° C.

3. The method for 3D inkjet printing according to claim 1, wherein the second composition further comprises at least one component selected from the group consisting of a catalyst, a physical property modifier, a dispersing agent, a cosolvent, and a coloring agent.

4. The method for 3D inkjet printing according to claim 3, wherein the catalyst is dibutyltin dilaurate (DBTDL).

5. The method for 3D inkjet printing according to claim 3, wherein the physical property modifier is at least one selected from the group consisting of polyols, polyether polyols, polyester polyols, and combinations thereof.

6. The method for 3D inkjet printing according to claim 1, wherein in the heating step, the second composition is applied to the surface of the first composition by any one of a flat coating method, a sputtering method, a spraying method, a cast coating method, a roll coating method, and a strip coating method.

* * * * *